Inventor:
Frank S. Kasper

Inventor:
Frank S. Kasper

April 23, 1968   F. S. KASPER   3,379,234
METHODS OF EFFECTING SLICING OPERATIONS
Original Filed April 6, 1965   7 Sheets-Sheet 7

| FIG.3 | FIG.4 | FIG.5 | FIG.6 | FIG.7 |

Inventor:
Frank S. Kasper

United States Patent Office 3,379,234
Patented Apr. 23, 1968

3,379,234
METHODS OF EFFECTING SLICING OPERATIONS
Frank S. Kasper, Hazel Crest, Ill., assignor to Amtron, Inc., Midlothian, Ill., a corporation of Illinois
Original application Apr. 6, 1965, Ser. No. 445,887. Divided and this application May 25, 1967, Ser. No. 641,346
7 Claims. (Cl. 146—222)

ABSTRACT OF THE DISCLOSURE

A method for producing groups of sliced product of precise group weights involves advancing the product into a slicer by an electronically controlled device. The slices are deposited on a scale as sliced and an electronic control signal halts the slicing operation as the weight on the scale approaches the desired group weight. A weight comparison is effected between the desired weight and the actual weight on the scale to develop another electronic control signal which re-initiates operation of the slicer to automatically effect slicing of only a further amount of product as is required to attain the desired weight. Other features are disclosed.

The present application is a division of application Ser. No. 445,887, filed Apr. 6, 1965, now abandoned.

Background of the invention

The present invention relates to means for and methods of effecting commercial slicing operations, and more particularly to means for and methods of accurately controlling the production of groups of sliced food products of preselected weight.

Sliced food products (e.g. bacon) present difficulties to the manufacturer in that the sliced product must be delivered to the consumer in accurate weight groups. In this connection, various statutes and regulations demand that each sliced group must have the weight specified on the packaging when offered to the consumer. Yet for efficient production, the weight must not substantially exceed this specified weight. Moreover, the production of the sliced group, including the necessary weighing and weight correction operations, must be accomplished as quickly as possible and with minimum labor costs. A significant drawback to accurate weight control of sliced food products stems from the fact that the sliced group cannot satisfactorily be brought up to the requisite minimum weight by the addition of a number of small portions or pieces of the product if the product is to receive the acceptance of consumers.

Summary of the invention

It is an object of the present invention to provide methods of effecting the production of discrete, accurate weight groups of sliced food products.

It is a further object of the present invention to provide methods of effecting slicing operations so as to yield increased weight accuracy in the groups of sliced product, increased production efficiency, improved appearance of the individual sliced product groups, and an overall lower product cost to the consumer.

Brief description of the drawings

Other objects and advantages will become apparent from the following detailed description of one preferred embodiment of the invention, particularly when considered in conjunction with the accompanying drawings, wherein.

Description of the preferred embodiment

In accordance with the present invention, accurate preselected amounts of sliced food products (e.g. bacon) are yielded by an automatic slicing device and supplied via suitable conveying means to automatic packaging apparatus. More particularly, the apparatus includes a scale whereto the sliced meat is delivered, a slicing mechanism which supplies the meat to the scale, a conveying means which transports the sliced meat in discrete groups (i.e. as dictated by weight) away from the scale, and a control means for effecting these operations in reliable, automatic fashion.

The control means functions so that the product (e.g. bacon) is sliced onto a moving scale conveyor until such time as a preselected weight accumulation is sensed by the scale. Preferably, the system is conditioned to respond to a preselected light weight before being rendered effective (e.g. an accumulation of 15 ounces of the sliced product when slicing discrete one pound groups). When the proper "light weight" has been reached, the control means functions to deactuate the slicing mechanism and stop the moving scale conveyor. The system remains at rest for a preselected period of time after which a true weight reading is taken. A signal is produced in response to the true weight reading and this signal is converted into a time signal by the control circuit. This time signal results in the slicing mechanism being rendered effective to slice an additional amount of the product, thereby bringing that sliced group up to the exact weight. After this occurs, the conveying means is rendered effective to rapidly transport the sliced product group away from the slicer before the slicing of another group of the product is commenced.

Figure 1:
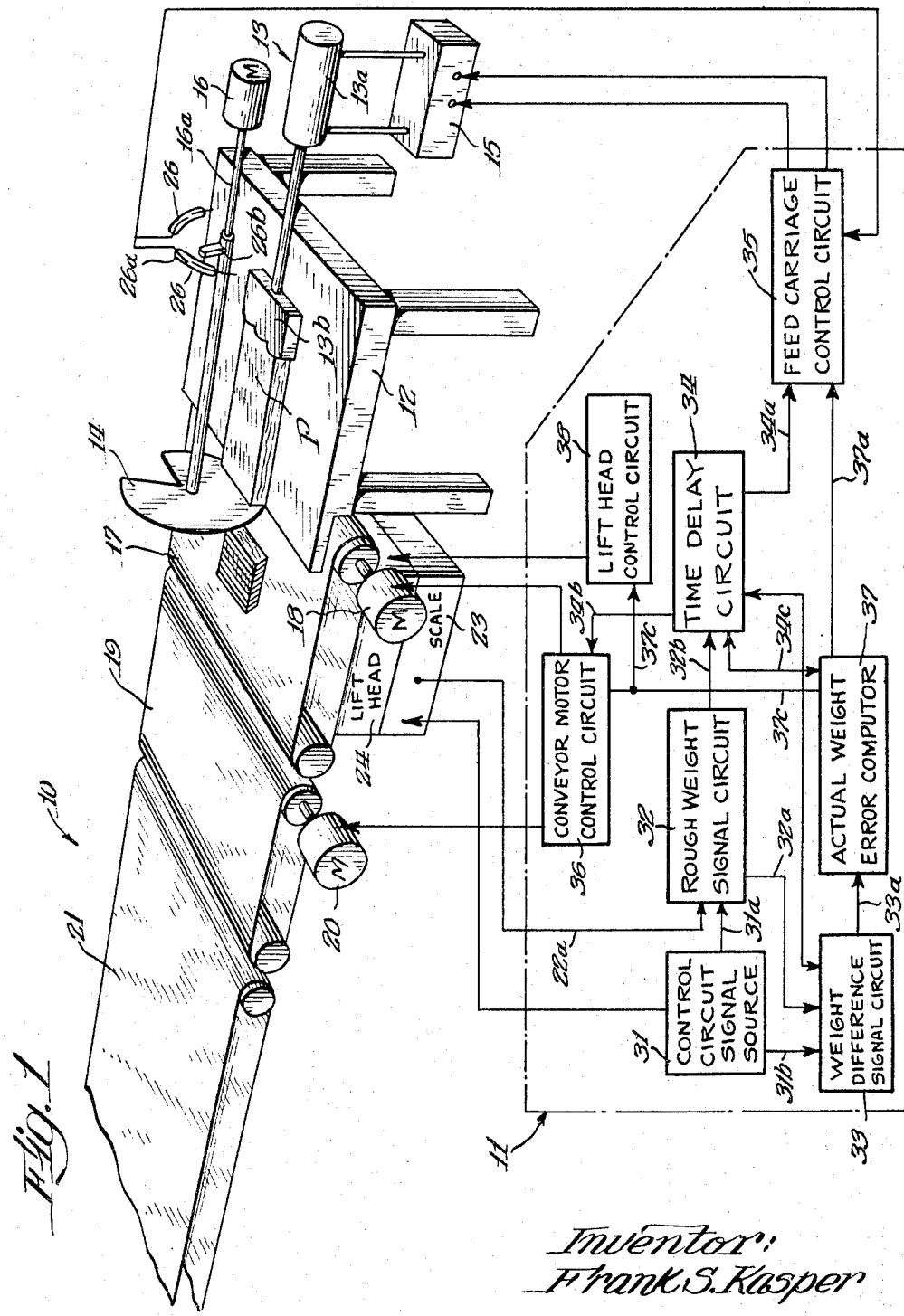
FIGURE 1 is a diagrammatic illustration of an automatic slicing apparatus, which is capable of effecting the production of groups of sliced food products in accordance with the present invention, and the associated control circuit for the slicing apparatus.

FIGURE 1 presents a diagrammatic representation of automatic slicing apparatus 10 which effects the production of accurate weight groups of sliced food products in accordance with the present invention and pursuant to a mode of operation dictated by a control circuit 11. The apparatus 10 preferably includes a work table 12 on and relative to which product P is moved during slicing operations effected by the apparatus 10 under the control of the circuit 11. In addition, the apparatus 10 includes a product feed carriage mechanism 13 that effects the advancement of the product P relative to the table 12 and a rotary slicing or cutting blade 14 that is continuously driven in a conventional manner by a motor 16 through a shaft 16a. The operation of the product feed carriage mechanism 13 is preferably dictated by a hydraulically operated piston cylinder arrangement 13a that effects the selective advancement of a product engaging member 13b in response to the high speed actuation of a valving mechanism 15 that controls the supply of the carriage actuating hydraulic fluid to the cylinder 13a.

Slices of the product P are severed by the driven rotary cutting blade 14 and are deposited on a relatively short scale conveyor 17 that is selectively driven by a variable speed motor 18. The scale conveyor 17 supplies the sliced product to an intermediate conveyor 19 that is similarly controlled by a variable speed motor 20 and which, in turn, supplies the sliced product groups to a single speed conveyor 21 associated with suitable packaging apparatus (not shown).

Figure 2:
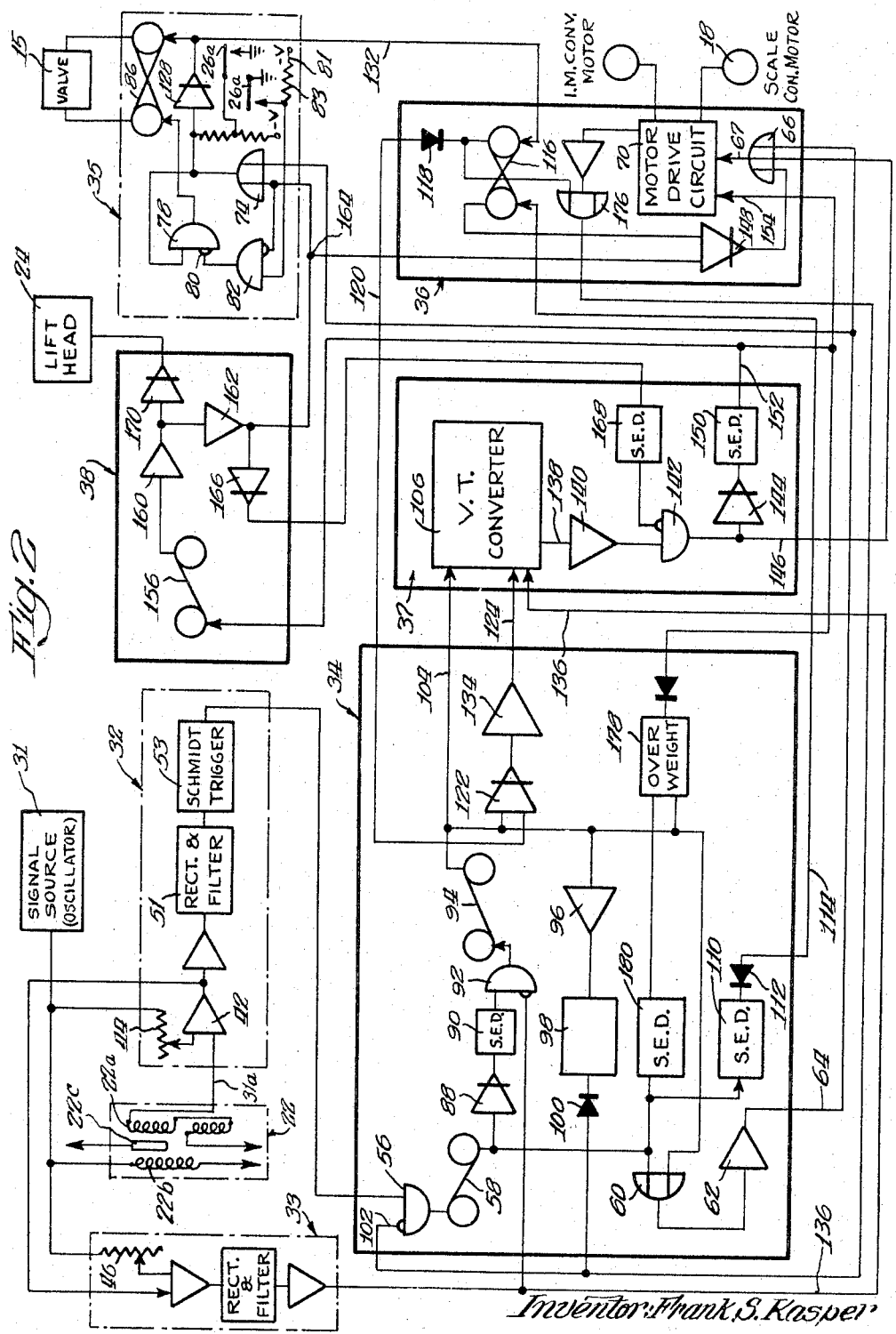
FIGURE 2 is a more detailed block logic diagram of the control circuit illustrate in FIGURE 1.
Figure 3:
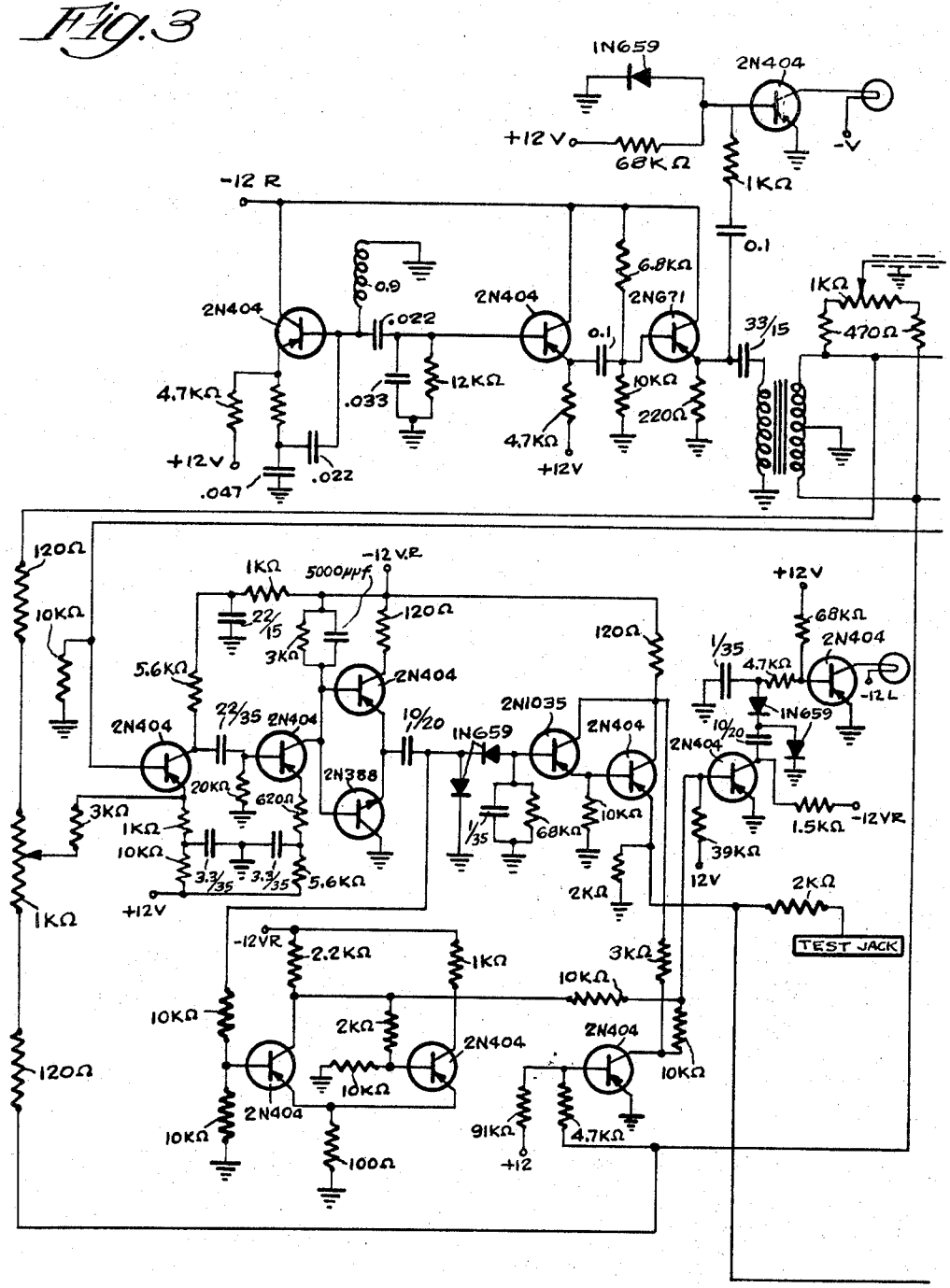
FIGURES 3–7, when assembled as shown in FIGURE 8, constitute the detailed schematic of the control circuit depicted in FIGURE 2.
Figure 4:
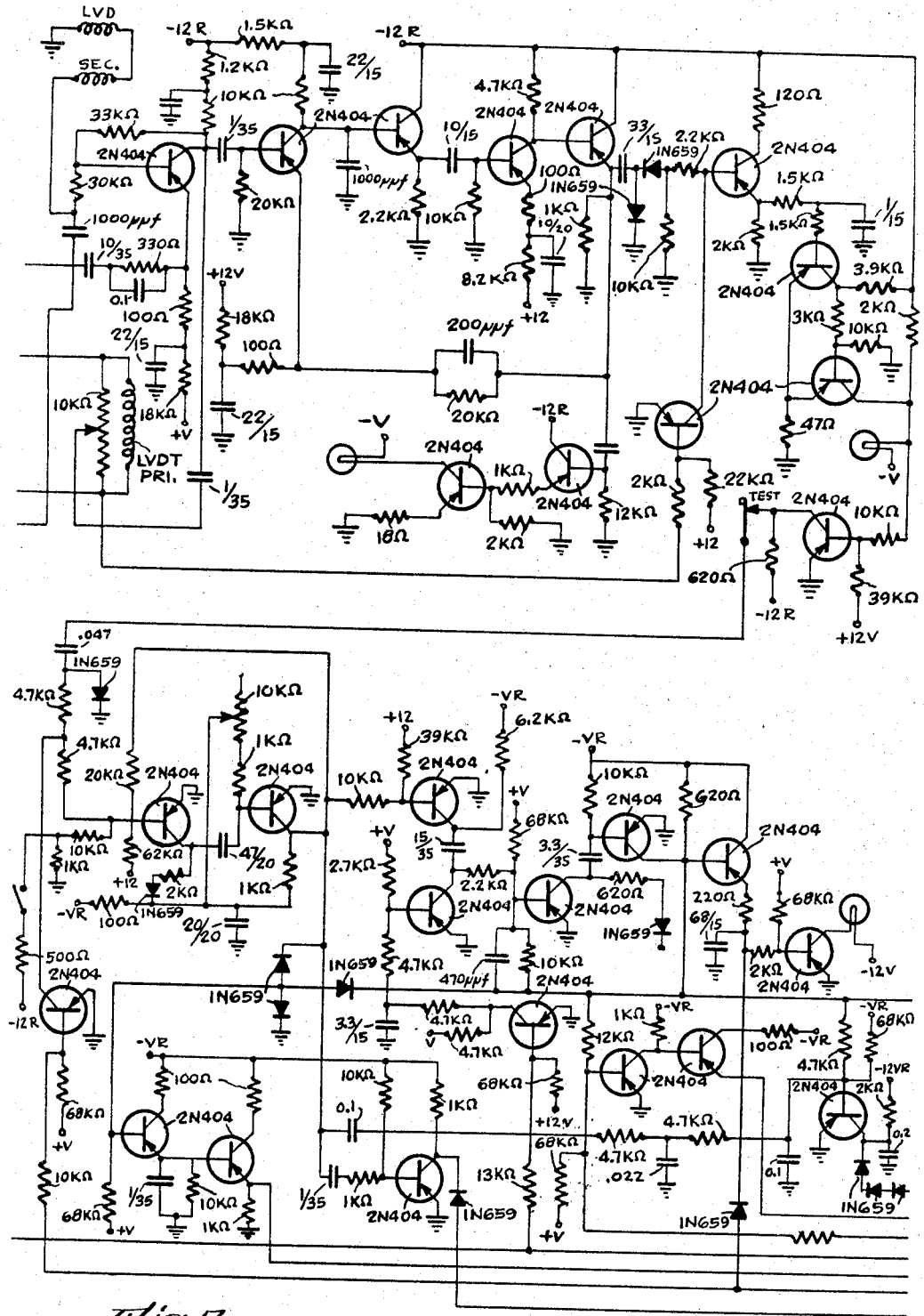
Figure 5:
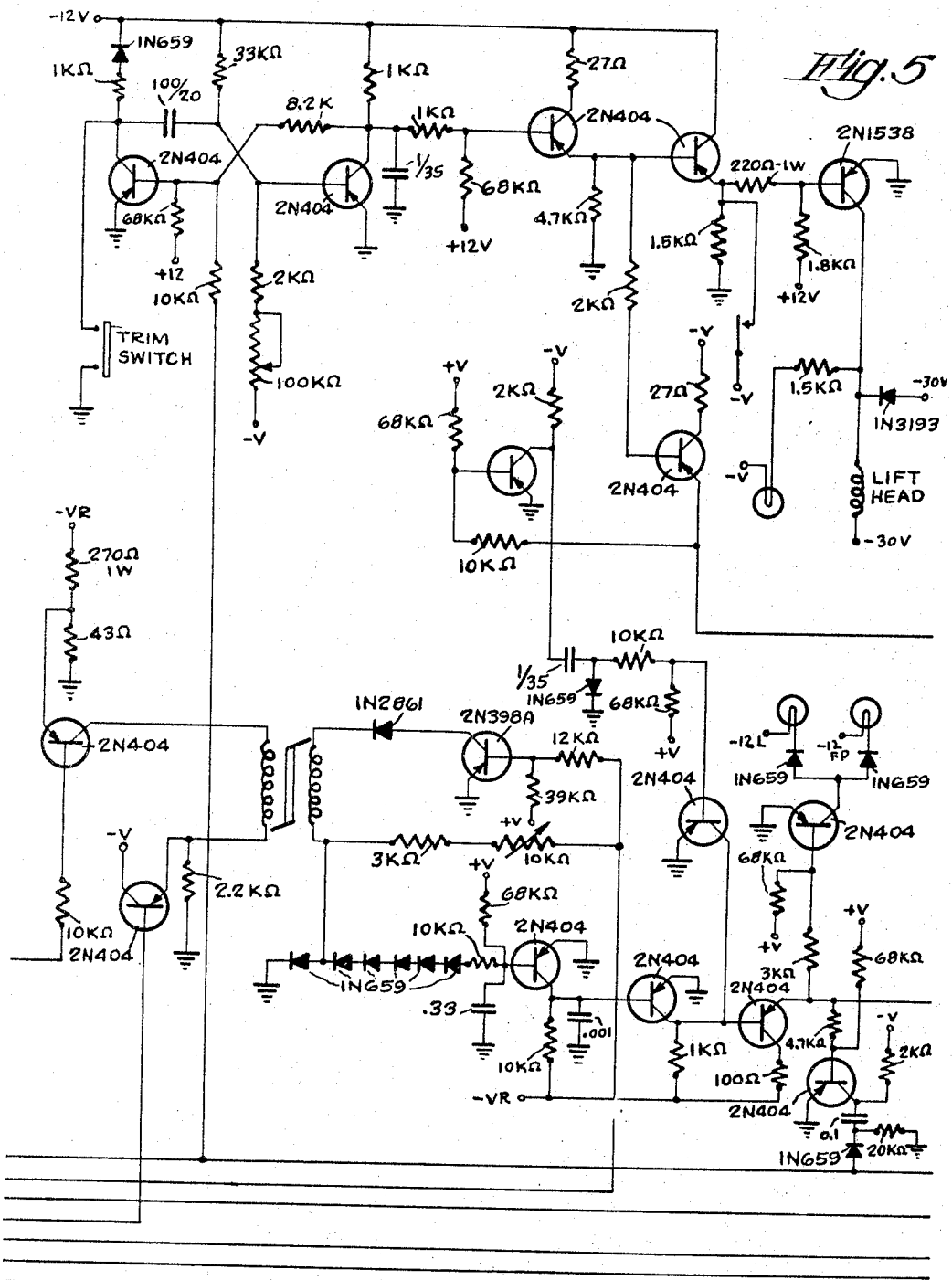
Figure 6:
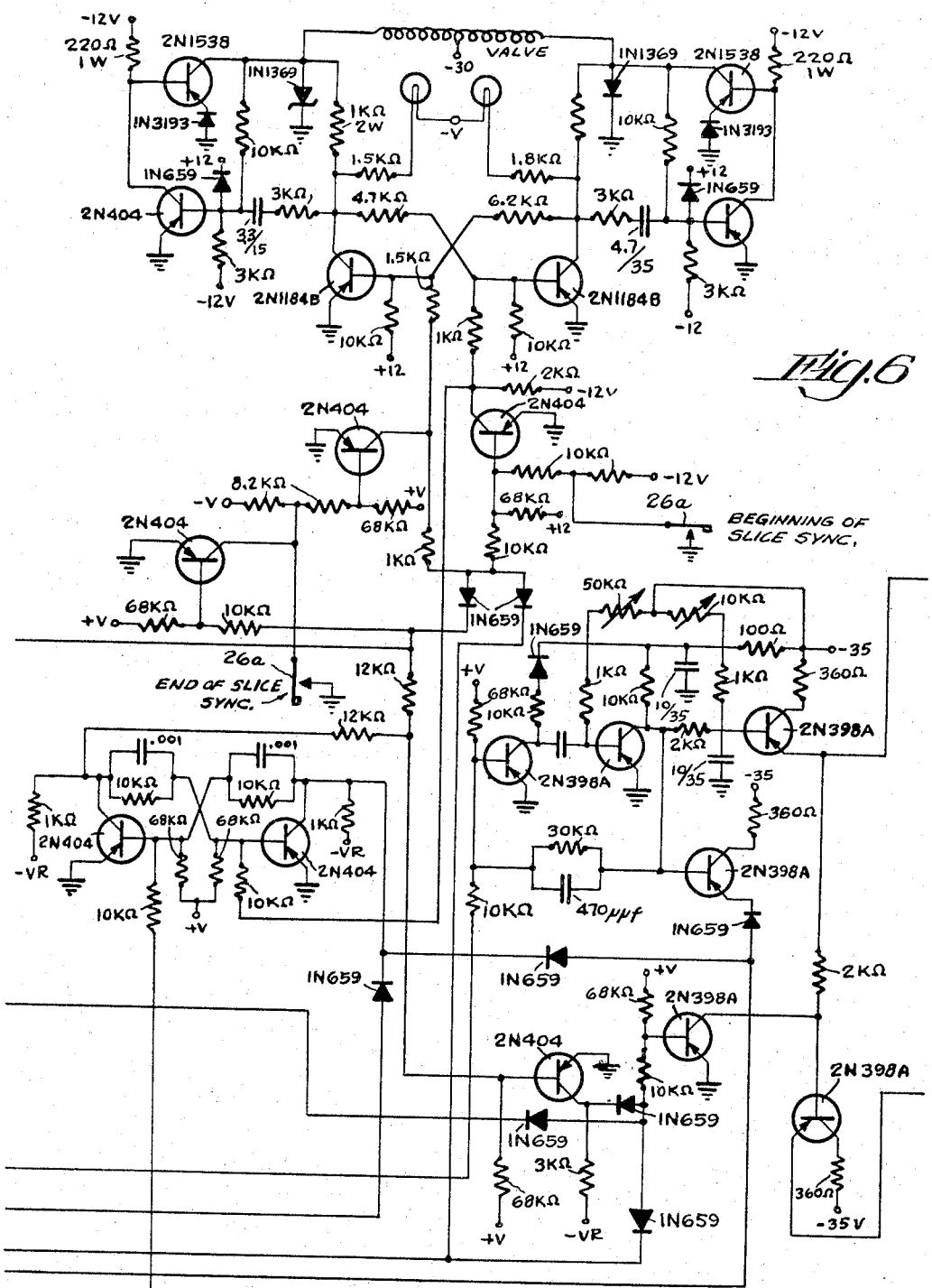
Figures 7, 8:
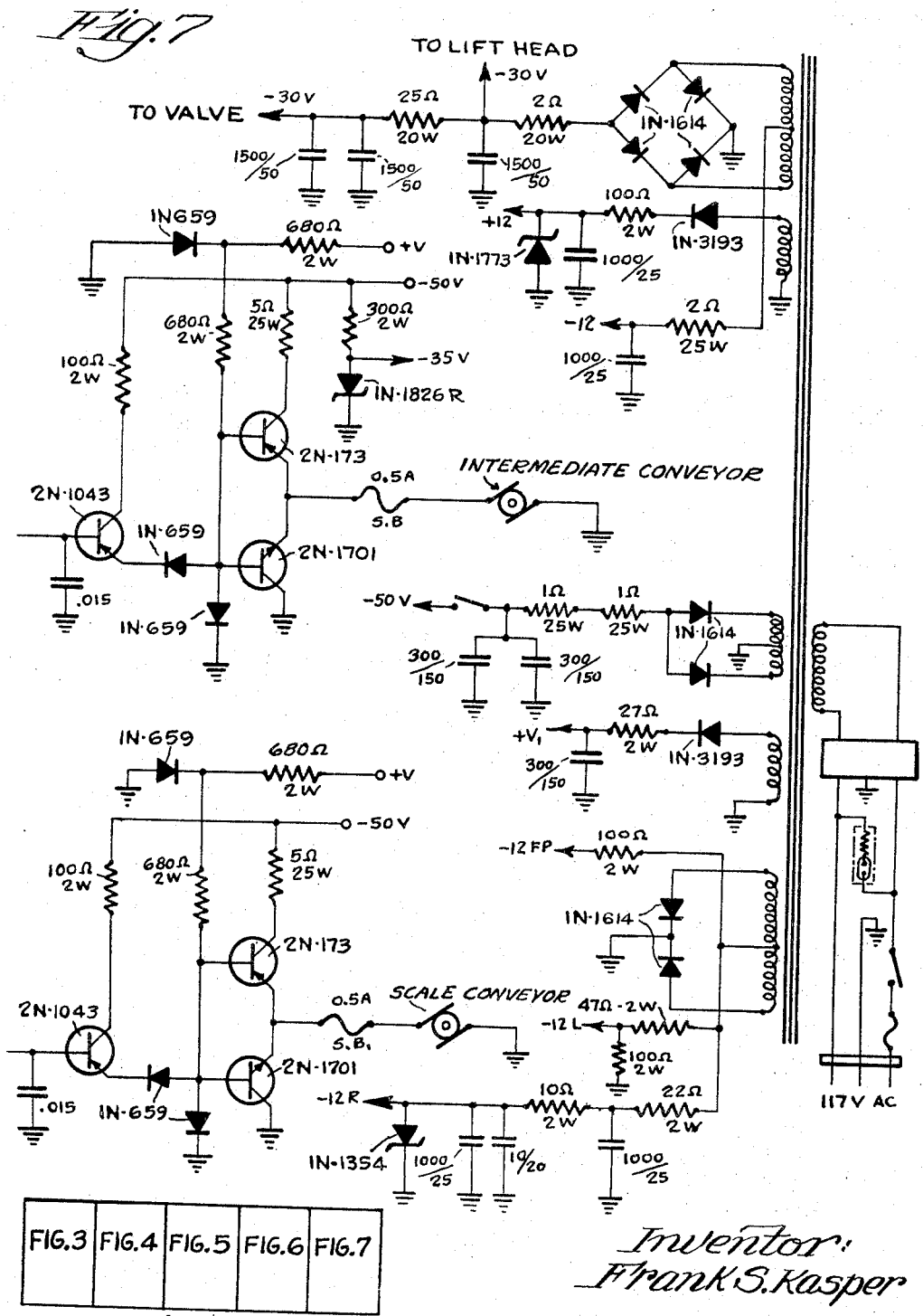

A weight respective transducer 22 (FIGURE 2) is associated with a scale mechanism 23 for the scale conveyor 17, and an electro-mechanical lift head mechanism 24 is similarly associated with this scale conveyor so as to preclude the scale mechanism 23 from being actuated during selected periods of a cycle of operation as dictated by the control circuit 11. As hereinafter described in detail, the lifthead effectively replaces the "spring action" in the scale conveyor to allow the scale conveyor to be rapidly returned to a weight responsive condition after a weight measurement has been effected.

In the illustrated embodiment, the position of the rotary cutting blade 14 is detected by a pair of transducers 26, each of which preferably includes a fixedly mounted glass reed switch 26a having a pair of normally open contacts that are closed by a magnetic switch actuating element 26b that is secured to the driven shaft 16a associated with the cutting blade 14. One of the glass reed switches 26a is located so that the contacts of the glass reed switch are transiently closed at a time when the rotary cutting blade is positioned so that it is appropriate to advance the product feed carriage and accordingly the product P and thereby initiate a slicing operation. The glass reed switch of the other transducer 26 is situated so that the contacts thereof are transiently closed when the rotary cutting blade is in a position whereat a complete slice has just been removed from the product P (i.e. a time when it would be appropriate to render the product weight carriage transiently ineffective during an operating cycle).

Those skilled in the art will be generally familiar with various of the structural components of the apparatus 10 since such components are presently employed in forms of commercially available food product slicing equipment. For a more detailed treatment of various of these structural components of the apparatus 10, reference is made to disclosures such as the patent to Dahms et al., Patent No. 3,010,499 and patents referenced therein. Notwithstanding other of the specific structural details, it is preferred that the apparatus of the present invention include a multiple conveyor arrangement (i.e. the independently operable, variable speed scale conveyor 17, the variable speed intermediate conveyor 19 and the constant speed take away conveyor 21), the promptly responsive product feed carriage mechanism 13, and the control circuit 11 which selectively dictates the operation of these various components to insure that accurate weight groups of sliced product are automatically yielded by the apparatus and supplied via the conveyor 21 to suitable packaging means.

In this latter connection, the control circuit 11 preferably includes a signal source 31 such as an oscillator circuit that produces a substantially constant output signal. This output signal is supplied to the transducer 22 associated with the scale mechanism 23, to a rough weight signal circuit 32, and to a weight difference signal circuit 33. The transducer 22 is preferably a conventional form of linear voltage differential transformer including a primary winding and a split secondary winding which is coupled to the primary winding by a movable coupling element that is physically joined to the scale. In response to the accumulation of sliced product on the scale conveyor 17, the transducer 22 supplies a signal through a signal path 22a to the input of the rough weight signal circuit 32. This signal is received by the input circuitry of the rough weight signal circuit 32 along with the control circuit signal that is supplied to this same circuitry through a signal path 31a from the control circuit signal source 31.

In accordance with the present invention, the input circuitry of the rough weight signal circuit 32 is conditioned to respond to a preselected "light weight" accumulation of sliced product on the scale conveyor 17 (e.g. an accumulation of approximately 15 ounces of the sliced product when slicing discrete one pound groups). On the other hand, the input circuitry for the weight difference signal circuit 33 is conditioned to yield a signal that is indicative of the difference in the weight of the sliced product that is actually accumulated on the scale conveyor and the desired final weight (e.g. 16 ounces). Assuming that a complete slicing operation has just been initiated, the rough weight signal circuit 32 continuously monitors the output from the transducer 22. When an amount of sliced product having a weight equal to or greater than the preselected "light weight" is deposited on the scale conveyor 17, the input circuit of the rough weight signal circuit produces a signal indicative of the occurrence of this condition. This output signal is fed to the weight difference signal circuit 33 through a signal path 32a along with the signal that is continuously applied to the circuit 33 by the control circuit signal source 31 through signal path 31b. In addition, the rough weight signal circuit 32 indicates the accumulation of the preselected "light weight" of sliced product on the scale conveyor 17 by supplying an output signal through a signal path 32b to a time delay circuit 34.

Upon receipt of this signal and assuming the normal operational mode of the apparatus 10 and the associated control circuit 11, the time delay circuit initiates the running of consecutive first and second delay periods and supplies operating signals to various of the control means for the operative components of the slicing apparatus 10. More specifically, upon receipt of an output signal from the rough weight signal circuit 32, the time delay circuit 34 supplies a control signal to the product feed carriage control circuit 35 through a signal path 34a and a control signal to a conveyor motor control circuit 36 through a signal path 34b. Immediately prior to the time that the circuit 34 provides an output signal to the feed carriage control circuit 35 and an output signal to the motor control 36, these control circuits are dictating respectively, the normal advance of the product P relative to the rotary cutting blade 14 and the driving of the conveyors 17 and 19 at a normal operational speed.

Upon receipt of the output signal from the time delay circuit 34, the conveyor motor control circuit 36 causes the driving motor 18 and the associated scale conveyor 17 to be brought to an immediate stop. At the same time, the feed carriage control circuit 35 is conditioned to stop the advancement of the product feed carriage; however, this does not occur until the "end of slice" transducer 26 indicates that the slicing operation then in progress is completed.

After these components of the apparatus 10 are rendered transiently ineffective for the first delay period dictated by the time delay circuit 34, the vibratory movement of the scale conveyor 17 due to the impact effect of slices delivered thereto from the rotary slicing blade ceases to exist. Consequently, when the final reading of the actual weight of the sliced product accumulated on the scale conveyor is effected, this reading is unaffected by such misleading impact variations.

In this connection, the final reading of the weight of the accumulated sliced product is effected during the second time delay period immediately upon termination of the first time delay period. Accordingly, as the first delay period times out (i.e. due to variations in the conductive state of components within the time delay circuit 34, as hereinafter more fully set forth), other components of the time delay circuit are rendered effective to initiate the running of the second delay period during which the final weight reading is taken. As a result of the final weight reading, an error signal is produced to actuate the slicing apparatus 10 and thereby automatically yield the additional amount of sliced product necessary to bring the then accumulated "light weight" group on the scale conveyor 17 up to the desired final weight.

During the running of the second time delay period, the output from the time delay circuit 34 maintains the driving motor for the conveyor 17 and the product feed carriage in the stopped condition. In addition, the output from the time delay circuit during this period conditions an actual weight error computer circuit 37 for operation so that this error computer circuit produces an error signal that is accurately indicative of the amount of additional spliced product that is needed to complete the sliced group then being processed. When so conditioned for operation, actual weight error computer 37 senses and responds to the output from the weight difference signal circuit 33 that is supplied to this computer circuit through a signal path 33a. As generally outlined above, the output from the weight difference signal circuit 33 is a signal that represents the actual weight of the sliced product on the scale 17 and is indicative of the weight difference between the amount of this accumulated sliced product and the desired final weight of the sliced product group.

The actual weight error computer 37 receives the weight difference signal from the circuit 33 and translates this weight difference signal into an error signal during the second time delay period that is utilized to actuate the feed carriage control circuit 35 through a signal path 37a. This error signal causes the control circuit 37 to be operated (i.e. the product P to be advanced) for the period of time necessary to yield the additional amount of sliced product that is demanded to complete a sliced product group having the desired final weight (e.g. one pound). However, the error signal produced by the computer circuit 37 is not supplied to the feed carriage control circuit 35 until the second time delay period terminates as reflected by a signal supplied to the computer circuit 37 from the time delay circuit 34 through a signal path 34c.

Upon termination of the second time delay period (i.e. the delay period during which the necessary error signal is computed), an output signal is supplied to the product feed carriage control circuit 35 from the circuit 34 to condition the product feed carriage for operation. However, the product feed carriage is not rendered effective until the "beginning of slice" transducer 26 is actuated to indicate that the rotary slicing blade 14 is properly positioned to initiate a slicing operation. When the "beginning of slice" transducer 26 is so actuated, a signal is coupled to the actual weight error computer 37 to initiate the "read out" of the error signal. The product feed carriage mechanism 13 is also actuated at this time and remains in an actuated state to advance the product to the rotary slicing blade 14 until the error signal terminates at which time the product feed carriage is immediately halted.

A typical operational cycle of the apparatus 10 is concluded at the end of the error signal as sensed and respond to both by the conveyor motor control circuit 36 and a lift head circuit 38 that controls the operation of the lift head mechanism 24. More specifically, when the error signal is concluded, the motor control circuit 36 is provided with an input signal through a signal path 37c. This causes the motor control circuit to initiate high speed operation of the driving motors 18 and 20 and, accordingly, of the conveyors 17 and 19. As a result, the accurate weight, sliced product group that has just been yielded by the apparatus 10 is at least partially removed from the scale conveyor 17 and delivered to the intermediate conveyor 10 so that a subsequent slicing operation can be initiated without undue delay. The high speed operation of the conveyors 17 and 19 also facilitates the adequate spacing of the individual groups of the sliced product. In this connection, it is preferred that the conveyors 17 and 19 be operated in the high speed mode for a period of time that is preset in the motor control circuit 36, as hereinafter more fully set forth.

The spacing of the groups of sliced product is further effected by the operation of the lift head mechanism 24 in response to the signal that is supplied to the lift head control circuit 38 from the actual weight error computer 37 through a signal path 37c. Preferably, this lift head control circuit also includes timing circuitry so that the lift head mechanism is operated for a period of time greater than that during which the high speed operation of the conveyors 17 and 19 occurs. The reason for this preferred mode of operation is that the reversion of the scale conveyor 17 from a high speed operational mode to the normal speed operational mode could perhaps be accompanied by fluctuations of the scale mechanism. Inasmuch as this might cause a cycle of operation to be prematurely initiated, the lift head mechanism 24 precludes the scale mechanism from sensing any such mechanical fluctuations.

As the operating cycle of the lift head control circuit 38 is terminated, the lift head mechanism is deactivated and rapidly returns the scale conveyor to a weight responsive conditioning and the entire control circuit 11 is conditioned for a subsequent cycle of operation. However, during the period when the lift head mechanism is in an actuated condition, the lift head control circuit 38 creates inhibiting conditions in the control circuit which precludes any of the operational components from being rendered effective prematurely.

Before treating the control circuit 11 in detail, it should be understood that the present invention contemplates an accurate and sophisticated approach to the production of accurate weight groups of sliced products (e.g. food products such as bacon, cold cuts, etc.). Consequently, a typical operational cycle of the apparatus 10 as dictated by the control circuit 11 is preferably carried out so that the error signal generated by the actual weight error computer circuit 37 dictates the production of a commercially acceptable partial slice (i.e. the apparatus is operated within less than "one slice" limits). While this obviously depends upon the weight difference between the "light weight" condition to which the input circuitry of the rough weight signal circuit 32 is set to respond, companies marketing prepackaged groups of sliced food products are concerned with efficient, low cost production operations and with consumer acceptance of their product. In this regard, it is important to yield an acceptable product without constantly producing overweight groups and the present invention is suited to satisfy these requirements. That is, the actual weight error computer circuit 37 can be preconditioned so that it will produce at least a minimum error signal each time it is actuated so as to yield at least a minimum fractional slice that will satisfy consumer demand without substantial "give-away" on overweight product groups. Obviously, there will be those product groups which will be of a weight such that no additional sliced product will be added to the group even when the circuit is conditioned to operate in this latter mode.

The control circuit 11 and the various signal paths which are diagrammatically illustrated in FIGURE 1 are depicted in full and complete detail in FIGURES 2–7. With specific reference to FIGURE 2, the stationarily mounted, split secondary winding 22a of the transducer 22 is coupled to the stationarily mounted, primary winding 22b by a movable coupling element 22c that is directly connected to the scale head for movement therewith. The normal physical relationship of these elements is such that the signal supplied to the primary winding 22b from the signal source 31 causes a maximum signal to be produced by the transducer 22 when there is no sliced product on the scale conveyor 17. However, as the scale head moves in response to sliced product being deposited thereon, the coupling between the primary and split secondary winding is directly varied to yield a signal, the magnitude of which reflects the weight of the accumulated sliced material.

More specifically, in addition to the primary winding of the linear voltage differential transformer that constitutes the transducer 22, the output from the signal source 31 supplies one input to a unity gain difference amplifier 42 in the rough weight signal circuit 32 through a "weight difference" potentiometer 44. The output from the oscillator 40 is also connected through an "actual weight" potentiometer 46 and is supplied to one input of a difference amplifier 48 in the weight difference signal circuit 33. The winding 22a supplies the other input to the amplifier 42, and the output of this circuit supplies the other input to the amplifier 48.

The "weight difference" potentiometer 44 in the input to the rough weight signal circuit 32 allows the input signal to this circuit from the source or oscillator 31 to be selectively preset. Accordingly, circuit conditions are established so that the amplifier 42 in the rough weight signal circuit responds to and produces a signal indicative of the accumulation of at least the preselected "light weight" amount of sliced product on the scale conveyor 17. Specifically, an adjustment is preferably made in the potentiometer 44 so that the amplifier 42 responds to an accumulated weight which is approximately one ounce light when one pound groups of sliced products are being produced by the apparatus 10. Consequently, when a given slicing cycle progresses to the point where this preselected "light weight" is accumulated on the scale, the rough weight signal circuit 32 is placed in a conductive state such that a conventional Schmitt trigger circuit 53 in the output thereof produces an output pulse. In this latter connection, the output from the difference amplifier is amplified and fed through a conventional rectifier and filter circuit 51 that yields a D.C. signal which only changes the conductive state of the Schmitt trigger circuit when the amplitude of this signal is above a preset level. The output pulse from the circuit 53 is supplied to the time delay circuit 34 to cause the scale conveyor and the product feed carriage to be brought to a rapid stop.

More specifically, the output signal from the circuit 32 is fed through an inhibitor 56 to trigger a one-shot multivibrator 58 in the time delay circuit 34. The output pulse from the one-shot multivibrator 58 dictates the running of the first time delay period and, in the illustrated embodiment, this pulse has a duration of approximately 226 milliseconds. This time delay pulse is supplied through an "or" circuit 60, and emitter follower 62 and is fed to an output lead 64. The output lead 64 is connected to an "or" circuit 66 in the conveyor motor control circuit 36. The output of the "or" circuit 66 is supplied to a "stop" input 67 of a variable speed motor drive circuit 70 and renders the motor 18 for the scale conveyor 17 transiently ineffective. In the absence of this signal, the motor for the scale conveyor runs this conveyor at a "normal speed."

The lead 64 is also connected to an "or" circuit 74 in the feed carriage control circuit 35, and the signal developed on the lead 64 is supplied through this "or" circuit to an inhibitor circuit 78. At various stages of an operating cycle, the inhibitor 78 is in an inhibit condition and does not respond to the signal from the "or" circuit 74 because a negative signal is supplied to the control lead 80 thereof from an inhibitor circuit 82. The inhibit signal from the inhibitor 82 is present until the position of the cutting blade 14 is such that the contacts of the "end of slice" switch 26a are closed indicating that a full slice has been completed. When the "end of slice" switch contacts close, the negative input that is supplied to the inhibitor 82 is grounded through these closed contacts and a resistor 83. As a result, the signal from the "or" circuit 74 is supplied through the inhibitor circuit 78 and is fed to and changes the conductive state of a flip-flop circuit 86. The output of the flip-flop circuit 86 controls the "stop-start" valving mechanism 15 associated with the product feed carriage 13a. The valving mechanism 15 stops the product feed carriage when the inhibitor 78 supplies a signal from the "or" circuit 74. To insure the rapid stop and start operation of the product feed carriage 13a, the hydraulic valving mechanism 15 is selected to be fast acting, having a preferred cycling speed of 7-9 milliseconds.

From the foregoing it will be appreciated that the control circuit senses the accumulation of the preselected "light weight" on the scale conveyor 17 and responds by immediately stopping the scale conveyor and by halting the product feed carriage when the slice in progress has been completed and before another slicing operation is commenced. After these operations are completed and the first delay period ends, the control circuit 11 initiates the actual weight determination and error signal generating cycles. In this connection, the output from the one-shot multivibrator 58 is also supplied through an inverter 88 to a signal end detector (S.E.D.) 90, which provides (by differentiation) an output pulse corresponding to the end of the first delay period (i.e. the 226-millisecond duration of the output pulse from multivibrator 58). The output of the signal end detector 90 is fed through an inhibitor 92 to actuate another one-shot multivibrator 94 and initiate the second time delay period. That is, the output from the multivibrator 94, which has a duration of approximately 25 milliseconds, controls the "actual" weight read-time period. Since the signal end detector 90 provides an output only at the end of the output pulse from the multivibrator 58, the beginning of the output pulse from the multivibrator 94 occurs approximately 226 milliseconds after both the scale conveyor motor 72 and the feed mechanism 22 have been halted. This 226-millisecond delay period after the scale conveyor is halted allows the scale to fully come to rest thereby eliminating potential errors in the "actual weight" scale reading due to mechanical vibrations stemming from the impact effect of the slices on the scale conveyor 17.

Considering the operation of the control circuit 11 during the accurate weighing cycle, the output of multivibrator 94 goes to an input of the "or" circuit 60, passes through this "or" circuit and the emitter follower 62 and is supplied to the lead 64. This signal on the lead 64 maintains the product feed mechanism 13a and the scale conveyor in the stopped condition created initially by the output from the multivibrator 58 at the start of the first time delay period.

The output from the multivibrator 94 also goes through an emitter follower 96, a hold-over circuit 98, and a diode 100 to the inhibit lead 102 of the inhibitor 56. Preferably, the hold over circuit 98 is a capacitive network, which when charged prevents the further rough weight triggering of the multivibrator 58 until a complete weighing cycle is completed. Finally, the output from the multivibrator 94 is fed through a lead 104 to a voltage to time (V-T) converter circuit 106 in the actual weight error computer 37. The V-T converter circuit 106 takes the difference weight signal supplied from the weight difference signal circuit 33 through the lead 136 and converts it into an error signal that actuates the product feed mechanism 13a for an accurate time period sufficient to slice the needed additional weight of material. The "additional weight" error signal is generated after the termination of the 25 millisecond delay period, during which time this error signal is computed by the circuit 106. High operational accuracy in the production of the signal is achieved because errors due to vibrations and other sources are integrated in the V-T converter circuit over the read-time period, e.g., an average weight reading for the entire 25-millisecond period is produced.

A suitable voltage to time converter circuit 106 is of the type disclosed in Patent No. 3,162,326. This circuit employs a transformer having a substantially rectangular hysteresis loop magnetic core. The circuit functions to integrate the volt-seconds of the input signal during the read time, and the output error signal is produced during the time it takes to reestablish initial core conditions. As the read time is a constant 25 milliseconds, the error time pulse is directly proportional to the integrated input voltage i.e., the averaged weight difference measurement.

A signal end detector (S.E.D.) 110 in the time delay circuit 34 also responds to the end of the 226-millisecond period and produces an output pulse that is supplied through a diode 112 to a lead 114. The lead 114 transmits this pulse to a conventional flip-flop circuit 116 in the motor control circuit 36 and causes this circuit to change conductive states so that a signal is fed through a diode 118 to one of the two inputs of a "nor" circuit 122. This signal at one input of the "nor" circuit 122 prevents any output signal from being produced. As a result, an emitter follower circuit 134 cannot be actuated to supply a signal to the lead 124. As will be understood from the disclosure contained in said Patent No. 3,162,326 and from a consideration of the schematic of FIGURE 5, the computed error signal cannot be read from the converter circuit 106 until a read out signal is supplied to this circuit through the lead 124. Therefore, the error signal is not derived from the computer 37 until the flip-flop circuit 116 again changes state as hereinafter fully described.

At the end of the second delay period defined by the operation of the multivibrator 94, the product feed carriage and scale conveyor "stop" signal is removed from the output lead 64 of the time delay circuit 34 and is no longer applied to the "or" circuit 74 in the product feed carriage control circuit 35. Therefore, the flip-flop circuit is conditioned to be reset and actuate the valving mechanism 15 into the start position. However, this action cannot take place until the negative potential supplied to the input of the inverter 128 is removed by the closing of the "beginning of slice" switch contacts (i.e. indicating that the blade 14 is properly positioned to begin slicing a full slice). When the mechanism 15 is actuated, the product feed carriage is advanced and continues to be advanced until the end of the error signal. During this time, the necessary additional slice is produced to bring the weight of the sliced group up to the desired final weight.

When the "beginning of slice" switch 26a is actuated to initiate the final slicing operation, the inverter 128 provides a signal through a lead 132 to reset the flip-flop circuit 116 in the motor control circuit 36. When this occurs, the aforedescribed blocking signal at the one input of the "nor" circuit 122 is removed. The "nor" circuit 122 then provides a signal to the lead 124 through the emitter follower 134 and this signal actuated the V-T converter so that the error signal is read out. In accordance with the invention, the error signal from the converter (i.e. a negative output pulse) is supplied through a lead 138, an amplifier 140, an inhibitor circuit 142, and to an output lead 146. The lead 146 provides a stop signal input to the variable speed motor drive circuit 70 so as to hold the scale conveyor 17 in the stopped condition while the weight correction is being made.

In the brief interval between the end of the time delay period defined by the multivibrator 94 and the occurrence of an output from the feed carriage control circuit 35 through the lead 132, the flip-flop circuit 116 provides no input to an inverter 148 in the motor control circuit 36. Therefore, the inverter 148 provides an output signal through the "or" circuit 66 to provide a stop signal for the motor 18 during this brief time interval.

The termination of the error signal on the output lead 138 of the V-T converter 106 is responded to be a signal end detector (S.E.D.) 150. The output from the detector 150 is fed to a second (high speed) input 154 of the motor drive circuit 70 through a lead 152. The motor drive circuit 70 there upon causes the conveyor 19 and scale conveyor 17 to go into a high speed removal mode of operation to quickly carry the completed and accurate weight sliced group at least partially off of the scale conveyor.

In accordance with the present invention, the motor drive circuit 70 preferably incorporates an adjustable self-timing network including an externally adjustable impedance element so that the high speed operation of the drive motors 18 and 20 of the conveyors 17 and 19 can be selectively varied. Because of the self-timing feature, the high speed operation of the motors 18 and 20 terminates automatically and the conveyors 17 and 19 return to their normal advancing rate independent of the operation of the remaining portion of the control circuit 11.

The signal supplied to the lead 154 (i.e. the output from the signal end detector 150) is also fed to the input of a one-shot multivibrator circuit 156 in the lift head control circuit 38. When supplied with this signal, the multivibrator 156 is actuated into an alternate conductive state for a period of time dictated by the components which comprise the multivibrator. When driven into the alternate conductive state, the multivibrator circuit 156 produces an output signal that brings the weight correction portion of the operating cycle to a halt. At the same time, the lift head mechanism 24 is actuated by the output from the multivibrator circuit so that adequate spacing of successive sliced groups is achieved. Obviously, the high speed operation of the conveyors 17 and 19 complements the operation of the lift head mechanism 24 in yielding the necessary spacing between the successive groups of sliced product. However, the timing circuitry of the motor drive circuit 70 preferably times out to halt the high speed operation of the conveyors prior to the time that the lift head is again deactuated. As previously pointed out, this is effected so that mechanical disturbances, which can occur when the conveyors return to their normal speed operation, are not transmitted to the responsive scale mechanism 23.

Considering the termination of an operating cycle, the multivibrator circuit 156 supplies a signal through the emitter followers 160 and 162 and through a lead 164 so that an inhibit signal is fed to the inhibitor 82 in the feed carriage control circuit 35. At the same time, this signal is fed through the "or" circuit 74 and is supplied to the input lead 80 of the inhibitor circuit 78. The signal that is supplied through the inhibitor circuit 78 actuates the flip-flop circuit 86 so that the valving mechanism 15 is activated and the product feed carriage is brought to a stop. Consequently, the carriage feed mechanism 13 immediately interrupts the advancement of the product P to the rotary slicing blade 14.

Although the advance of the product to the blade is immediately interrupted independent of the actuation of the "end of slice" transducer switch 26a, the previously established operating conditions for the circuit 11 and apparatus 10 are preferably such that the partial or feathered out slice that is yielded when the product feed carriage is abruptly stopped nevertheless is an acceptable slice. Of course, the V-T converter 106 can be preset to insure that a minimum error signal is produced to yield a slice of at least preselected minimum dimensions. In the alternative, the operation of the valving mechanism 15 at the end of the error signal can be tied in with the closing of the "end of slice" switch 26a. The choice in this matter is dictated by the self-imposed requirements of the producer and packager of the sliced product.

In addition to bringing the product feed carriage mechanism 13a to a halt, the output of the emitter follower 162 provides an inhibit signal to the V-T converter circuit 106. In this connection, the output from the emitter follower 162 is fed through an inverter circuit 166 and is supplied to the input of a signal end detector (S.E.D.) 168 in the actual weight error computer 37. When the multivibrator circuit 156 reverts to its normal conductive state, the signal end detector 168 responds to provide a signal to the inhibit lead of the inhibitor circuit 142. This inhibiting signal prevents any signal from being supplied from the V-T converter 156 at the beignning of the next succeeding cycle of operation.

With reference to the actuation of the lift head mechanism, the output from the emitter follower 160 is fed to an inverter circuit 170 and it is the output of this circuit that dictates the operation of the lift head mechanism 25. Although the lift head is normally in a deactuated state, the output of the inverter 170 causes this electromechanical device to be rendered effective in a conventional manner so as to preclude the scale from being operated during the period that the multivibrator 156 is in the alternate conductive state. When the multivibrator 156 times out and returns to the normal conductive state, the lift head mechanism 24 is deactuated and the entire control circuit is conditioned for a subsequent cycle of operation.

In this connection, after a complete slicing operation has terminated as just described, a subsequent operating cycle is started automatically. This subsequent cycle of operation is conditioned to be initiated when the multivibrator circuit 156 returns to its normal conductive state thereby removing the stop signal from the lead 164 at the input to the "or" circuit 74. That is, when the multivibrator circuit 156 times out, the valving mechanism actuates the product feed carriage to the start condition and a slicing cycle is initiated when the "beginning of slice" switch 26a is closed. Since the lift head mechanism is deactuated at this time, the scale conveyor 17 is again weight responsive. Moreover, because there is no signal input to the "or" circuit 66 in the motor control circuit 36, the scale conveyor 17 is running at the normal advancing rate and the sliced product accumulates thereon in shingled fashion until a rough weight signal is generated by the circuit 32 to initiate the error correction phase of the operating cycle as recited above.

If the accumulated sliced and shingled product that causes the generation of the rough weight signal has a weight equal to or in excess of the desired final weight, the control circuit 11 responds to this condition by precluding the occurrence of the weight correction phase of the operating cycle. That is, the control circuit 11 responds to this condition by precluding the further actuation of the product feed carriage and no additional sliced product is supplied to the scale conveyor.

More specificallly, if the weight of sliced produce accumulated on the scale conveyor 17 is equal to or slightly in excess of the desired final weight, the output signal from the weight difference signal circuit 33 has a magnitude such that the inhibitor circuit 92 in the time delay circuit 34 is actuated. Accordingly, the multivibrator circuit 94, the operation of which defines the second time delay period, is prevented from being triggered and the second time delay period is never initiated. In addition, an over-weight detector circuit 178 in the time delay circuit 34 senses the termination of the first time delay period as dictated by the multivibrator circuit 58 and also senses that the second time delay period does not occur (i.e. the multivibrator circuit 94 is not triggered into conduction).

As shown, one input to the over-weight detecting circuit 178 is connected to the output of the multivibrator circuit 94 while the other input lead is connected through a signal and detector circuit 180 to the output of the multivibrator circuit 58. Upon sensing the aforedescribed conditions, the over-weight detecting circuit produces an output signal that is supplied to the high speed lead 154 of the motor drive circuit 70. This signal, which causes the motor drive circuit to be operated so that the conveyors 17 and 19 are actuated into the high speed operating mode, corresponds to the signal that is supplied from the signal end detector 150 in the error computer circuit 37 during a normal cycle of operation. After an output signal is produced by the over-weight detector circuit 178, the remaining portion of the operating cycle corresponds to the concluding phase of a normal operating cycle when an error correction signal has been generated and just terminated.

With reference to FIGURES 3–8, the various individual circuits which comprise the control circuit 11 are conventional circuits, and the components which comprise these circuits are specified in detail. These component values reflect the values employed in one embodiment of the control circuit so that the automatic production of accurate weight groups of sliced food products is effected by the apparatus 10 as recited above. With specific regard to FIGURES 3–7, it should be understood that a capacitor designation such as 10/20 refers to 10 mfd. @ 20 V.D.C., a designation such as .001 refers to .001 mfd. @ 200 V.D.C. and that all resistors are rated at ½-watt unless otherwise indicated.

It will be appreciated that the foregoing description of the invention is merely illustrative of one preferred structural embodiment and of a preferred mode of carrying out the production of accurate weight groups of sliced food products. It will also be appreciated that various modifications can be made both in the specific circuit arrangements and in the manner in which the production of the sliced groups is effected. For example, modifications of the apparatus and/or control circuit might be effected so that a preselected number of slices is yielded by the apparatus 10 after which time a weighing operation is effected to generate the production of the necessary error signal. While operating in this fashion, the apparatus produces the preselected number of slices and this operation is followed by the accurate weighing and weight correction phases as previously described. Obviously, the rough weight sensing operation is preferred since this technique inherently compensates for variations in the charactertistics of the product (e.g. density, size, etc.).

In this connection, when a cycle of operation including the aforedescribed "rough weight" sensing phase is carried out, the amount of sliced product which must be supplied to that already accumulated on the scale conveyor 17 is relatively small in comparison to the amount that has already been produced. Consequently, variations of the type noted above have little effect on the accuracy of the final sliced amount. Moreover, and as previously described, adjustments in the output from the V-T converter 106 can be made to compensate for any such variations that might exist or be anticipated and which might otherwise effect the final weight accuracy.

With reference to the preconditioning of the circuit 11 and/or making desired adjustments in the operating characteristics thereof after the apparatus has been carrying out slicing operations for a period of time, the potentiometers 44 and 46 can both be adjusted as desired. However, if after a period of slicing, it appears that the rough weight groups are unduly under the final desired weight or so close to it as to render the final slicing operation almost superfluous, compensating adjustments are preferably made only in the potentiometer 44. In this connection, corrective adjustments in the potentiometer 44 at the input to the rough weight signal circuit 32 also yield compensating changes in the difference weight signal circuit 33.

From the foregoing, it will be appreciated that the present invention provides methods of and means for carrying out the production of accurate weight groups of sliced food products. The invention is particularly suited to the meat packing industry but has obvious utility in other fields as well. In this regard, the various changes in and/or modifications of the invention necessary to adapt it for use in a particular environment and/or to facilitate carrying out a particular form of slicing operation are clearly contemplated by the foregoing and by the accompanying claims.

What is claimed is:

1. A method of automatically effecting the production of groups of sliced product of a desired final weight, which method comprises slicing an amount of product until a partial product group of at least a preselected weight is produced, effecting delayed accurate measurement of the weight of said partial product group, converting said accurate weight measurement into an electrical signal indicative of the additional amount of sliced product that must be added to said partial product group in order to yield a completed group of sliced product having the desired final weight, and automatically slicing said product for a period of time dictated by said signal so as to yield the additional amount of sliced product.

2. A method of automatically effecting the production of groups of sliced product of a desired final weight, which method camprises slicing on amount of product until a partial product group of at least a preselected weight is produced, said preselected weight being less than the desired final weight, effecting an accurate vibrationless measurement of the weight of said partial product group, converting said accurate weight measurement into an electrical signal of a duration indicative of the additional amount of sliced product that must be added to said partial product group in order to yield a completed group of sliced product having the desired final weight, and automatically slicing said product for a period of time dictated by said electrical signal so as to yield the additional amount of sliced product.

3. A method of automatically effecting the production of groups of sliced product of a desired final weight, which method comprises effecting the initial slicing of an amount of product until a partial product group of at least a preselected weight is produced, said preselected weight being less than the desired final weight, effecting an accurate measurement of the weight of said partial product group, converting said accurate weight measurement into an electrical signal of a duration indicative of the additional amount of sliced product that must be added to said partial product group in order to yield a completed group of sliced product having the desired final weight, and automatically effecting the final slicing of said product for a period of time dictated by said electrical signal so as to provide the additional amount of sliced product necessary to yield a product group having the desired final weight.

4. A method of automatically effecting the production of groups of sliced product of a preselected final weight comprising the steps of:
advancing said product into a slicer at a predetermined rate by an electronically controlled advancing means;
depositing the slices of said product on a scale;
providing a first electronic control signal to said advancing means to halt said means when an apparent weight of sliced product approximating, but less than, said preselected weight is deposited on said scale;
comparing the weight of said product on said scale and said preselected final weight to develop a second electronic control signal indicative of the difference therebetween;
re-initiating operation of said advancing means and utilizing said second control signal to automatically effect slicing of only a further amount of said product as is necessary to attain said preselected weight.

5. The method according to claim 4 in which said scale serves also as a conveyor to transport said sliced product at a given rate and further including the step of:
applying an electronic control signal to said conveyor subsequent to accumulation of said sliced product of said final weight thereon to momentarily effect a substantial increase in the rate of transport of said conveyor.

6. The method according to claim 5 and further including the step of:
applying an inhibiting signal to said scale at the commencement of slicing each new product group to prevent effective weight measurement thereby for a predetermined time interval which is less than the time required to slice an amount of product corresponding to said approximate weight.

7. The method according to claim 6 and further including the step of:
waiting a predetermined time interval after said halting of said advancing means before measuring the weight value of said sliced product which is used for comparison with said predetermined final weight to thereby avoid possible errors in true weight attendant depositing said slices on said scale.

References Cited

UNITED STATES PATENTS

| | | | |
|---|---|---|---|
| 2,502,380 | 3/1950 | Howard | 177—120 |
| 2,592,083 | 4/1952 | Vagim | 177—120 |
| 2,870,810 | 1/1959 | Folk | 146—94 |
| 2,898,962 | 8/1959 | Burnett | 146—94 |
| 2,969,099 | 1/1961 | Gillman | 146—94 |
| 2,989,104 | 6/1961 | Good | 146—94 |
| 3,010,499 | 11/1961 | Dahms et al. | 146—94 |
| 3,015,350 | 1/1962 | Reichel et al. | 146—94 |
| 3,027,924 | 4/1962 | Gillman | 146—94 |
| 3,099,304 | 7/1963 | Monsees et al. | 146—94 |

W. GRAYDON ABERCROMBIE, *Primary Examiner.*